US012204355B2

(12) United States Patent
Mii et al.

(10) Patent No.: US 12,204,355 B2
(45) Date of Patent: Jan. 21, 2025

(54) CONSTANT VOLTAGE GENERATOR CIRCUIT OPERATING AT LOW VOLTAGE POTENTIAL DIFFERENCE BETWEEN INPUT VOLTAGE AND OUTPUT VOLTAGE

(71) Applicant: Nisshinbo Micro Devices Inc., Tokyo (JP)

(72) Inventors: Kenji Mii, Ibaraki (JP); Kohji Yoshii, Toyonaka (JP)

(73) Assignee: NISSHINBO MICRO DEVICES INC., Tokyo (JP)

(*) Notice: Subject to any disclaimer, the term of this patent is extended or adjusted under 35 U.S.C. 154(b) by 0 days.

(21) Appl. No.: 17/596,242

(22) PCT Filed: May 24, 2021

(86) PCT No.: PCT/JP2021/019626
§ 371 (c)(1),
(2) Date: Dec. 6, 2021

(87) PCT Pub. No.: WO2022/249244
PCT Pub. Date: Dec. 1, 2022

(65) Prior Publication Data

US 2024/0231401 A1 Jul. 11, 2024

(51) Int. Cl.
*G05F 1/573* (2006.01)
*G05F 1/575* (2006.01)

(52) U.S. Cl.
CPC ............ *G05F 1/5735* (2013.01); *G05F 1/575* (2013.01)

(58) Field of Classification Search
CPC ... G05F 1/00; G05F 1/46; G05F 1/461; G05F 1/462; G05F 1/466; G05F 1/467;
(Continued)

(56) References Cited

U.S. PATENT DOCUMENTS

2008/0061881 A1* 3/2008 Takagi .................. H03F 1/0277 330/261
2008/0278127 A1* 11/2008 Nagata ...................... G05F 1/56 323/276

(Continued)

FOREIGN PATENT DOCUMENTS

JP 2002-312043 10/2002
JP 2007-011425 1/2007

(Continued)

OTHER PUBLICATIONS

English translation of JP-2009123172-A. (Year: 2009).*

(Continued)

*Primary Examiner* — Thienvu V Tran
*Assistant Examiner* — Carlos O Rivera-Perez
(74) *Attorney, Agent, or Firm* — Paul Teng

(57) ABSTRACT

A constant voltage generator circuit includes a first amplifier circuit that drives a transistor controlling an output current based on a reference voltage; a second amplifier circuit that drives the transistor based on the reference voltage from the power source; a protection circuit that limit an output current flowing through the load from the transistor; and a control circuit that controls operation of the second amplifier circuit. The control circuit controls the second amplifier circuit to operate or not to operate based on a relationship between the output current and predetermined first or second threshold. The second amplifier circuit further includes a first operation voltage potential fixing circuit that fixes an operation voltage potential of an internal node of the second amplifier circuit during non-operation thereof.

12 Claims, 7 Drawing Sheets

(58) Field of Classification Search
CPC . G05F 1/468; G05F 1/56; G05F 1/561; G05F 1/562; G05F 1/563; G05F 1/565; G05F 1/569; G05F 1/573; G05F 1/5735; G05F 1/575; G05F 1/59; G05F 1/595; G05F 1/613; G05F 1/614; G05F 1/618; G05F 3/00; G05F 3/02; G05F 3/0816; G05F 3/20; G05F 3/205; G05F 3/22; G05F 3/24; G05F 3/26; G05F 3/262–267
USPC ........ 323/223–226, 266, 268–277, 280–286, 323/304, 311–317, 351, 908; 327/538–543
See application file for complete search history.

(56) References Cited

U.S. PATENT DOCUMENTS

2011/0121890 A1* 5/2011 Kikuchi .................... G05F 1/56 327/541
2011/0309819 A1* 12/2011 Notani ...................... G05F 1/10 323/314
2019/0302820 A1* 10/2019 Yasusaka ................ G05F 1/575

FOREIGN PATENT DOCUMENTS

| | | | | |
|---|---|---|---|---|
| JP | 2007-086980 | | | 4/2007 |
| JP | 2009-123172 | | | 6/2009 |
| JP | 2009123172 | A | * | 6/2009 |
| JP | 2011-096210 | | | 5/2011 |
| JP | 2012155395 | A | * | 8/2012 |
| JP | 2019-185095 | | | 10/2019 |

OTHER PUBLICATIONS

English translation of JP-2012155395-A. (Year: 2012).*
Dec. 7, 2023 Notification Of Transmittal of Translation of the International Preliminary Report on Patentability (IPRP) in connection with PCT/JP2021/019626.

* cited by examiner

CONSTANT VOLTAGE GENERATOR CIRCUIT OPERATING AT LOW VOLTAGE POTENTIAL DIFFERENCE BETWEEN INPUT VOLTAGE AND OUTPUT VOLTAGE

TECHNICAL FIELD

The present invention relates to a constant voltage generator circuit such as a low-dropout regulator (hereinafter, referred to as LDO), for example, that operates even with a relatively low input-to-output voltage potential difference.

BACKGROUND ART

Conventionally, in a configuration of a power source circuit that switches between a plurality of modes according to polarities of an output voltage value, an output current value, or a terminal application voltage, when a reference voltage source is shared, a voltage potential of one or both of a drain and a source of a transistor connected to the reference voltage source fluctuates during the switching between the modes. During the switching, a parasitic capacitance of the transistor acts as a coupling capacitance, noise is superimposed on the reference voltage source, and a reference voltage changes before and after the switching. As a result, an output voltage of the power source circuit follows the reference voltage, and thus, a change in the output voltage or a change in an output current accompanying the change in the output voltage of the power source circuit occurs. There is such a problem that an unintended mode transition is induced by the change in the output voltage or the change in the output current accompanying the change in the output voltage of the power source circuit, and a malfunction that continues to transition between the modes occurs in the worst case.

As means for avoiding the above malfunction, a method using different reference voltage sources in a circuit in which voltage potential fluctuation occurs and the other circuit so as not to affect an operation of the other circuit is already known. In addition, a method for reducing the parasitic capacitance by reducing a size of the transistor connected to the reference voltage source in which the voltage potential of one or both of the drain and the source fluctuates during the mode switching in order to suppress an absolute value of the noise superimposed on the reference voltage source is also a known fact. Further, as a known technique, there is also a method for giving an offset to a differential amplifier such that the mode switching does not occur by the change in the output voltage of the power source circuit due to the presence of control in which the output voltage of the power source circuit follows the reference voltage when the reference voltage changes before and after the switching or the change in the output current accompanying the change in the output voltage.

For example, Patent Document 1 discloses a series regulator that includes a first amplifier that drives a first transistor connected between a power source and a load, a second amplifier that drives a second transistor connected in parallel to the first transistor, and an amplifier control circuit that controls each of the first amplifier and the second amplifier. In the series regulator, a current capability of the second transistor is set to be smaller than a current capability of the first transistor, and a current consumption of the second amplifier is set to be smaller than a current consumption of the first amplifier. The amplifier control circuit sets a first output current flowing through the first transistor to a zero value in a first load region where an output current flowing through a load is smaller than a predetermined amplifier switching threshold, and controls each of the first amplifier and the second amplifier such that a second output current flowing through the second transistor covers all the output currents. On the other hand, in a second load region where the output current is larger than the amplifier switching threshold, the second output current is set to a zero value or a fixed value smaller than the amplifier switching threshold. In addition, the first amplifier and the second amplifier are controlled such that the first output current covers all of the output currents or a difference obtained by subtracting the second output current from the output current.

PRIOR ART DOCUMENT

Patent Document

Patent Document 1: Japanese patent laid-open publication No. JP2019-185095A

SUMMARY OF THE INVENTION

Problems to be Solved by the Invention

However, as the method for avoiding the malfunction that continues to transition between the modes so far, the method using the different reference voltage sources leads to an increase in a chip area and deterioration in accuracy due to a difference in the output voltage between the modes due to a finish variation of the reference voltage source. In addition, in the method for reducing the transistor size, a mismatch between the transistors occurs, and a characteristic variation of a comparator or a differential amplifier increases. As a result, a difference in the output voltage generated between the modes increases, and thus, the accuracy of the output voltage deteriorates. Further, since the method for giving the offset to the differential amplifier requires giving an offset equal to or greater than the noise superimposed on the reference voltage source, there is such a problem that the accuracy of the output voltage deteriorates similarly to the above.

An object of the present invention is to solve the above problems and is to provide a constant voltage generator circuit capable of preventing the malfunction that continues to transition between a plurality of modes while suppressing deterioration in accuracy of the output voltage as compared with the prior art.

Means for Dissolving the Problems

According to one aspect of the present invention, there is provided a constant voltage generator circuit including a transistor, a first amplifier circuit, a second amplifier circuit, a protection circuit, and a control circuit. The transistor is connected between a power source and a load, and controls an output current, the first amplifier circuit drives the transistor based on a reference voltage from the power source, and the second amplifier circuit is connected in parallel to the first amplifier circuit, operates at a speed higher than that of the first amplifier circuit, and drives the transistor based on the reference voltage from the power source. The protection circuit is configured to limit an output current flowing through the load from the transistor during a predetermined operation, and the control circuit configured to control an operation of the second amplifier circuit. The control circuit controls the second amplifier circuit not to operate until the output current increases from a current during a light load and reaches a predetermined second threshold current, and to operate when the output current is equal to or greater than the second threshold current, whereas the control circuit controls the second amplifier circuit to operate until the output current decreases from a current during a heavy load and reaches a predetermined first threshold current smaller than the second threshold current, and not to operate when the output current is equal to or less than the first threshold current. The second amplifier circuit further includes a first operation voltage potential fixing circuit that fixes an operation voltage potential of an internal node of the second amplifier circuit during non-operation of the second amplifier circuit.

Effects of the Invention

Accordingly, in accordance with the constant voltage generator circuit according to the present invention, it is possible to suppress the change in the output voltage of the reference voltage source caused by the noise superimposition via the coupling capacitance. As a result, the offset voltage of the differential amplifier can be set to be small, and it is possible to prevent the malfunction in which the power source circuit continues to transition between the plurality of modes while suppressing the deterioration in the accuracy of the output voltage generated as the difference in the output voltage between the modes.

MODE FOR CARRYING OUT THE INVENTION

Figure 1:
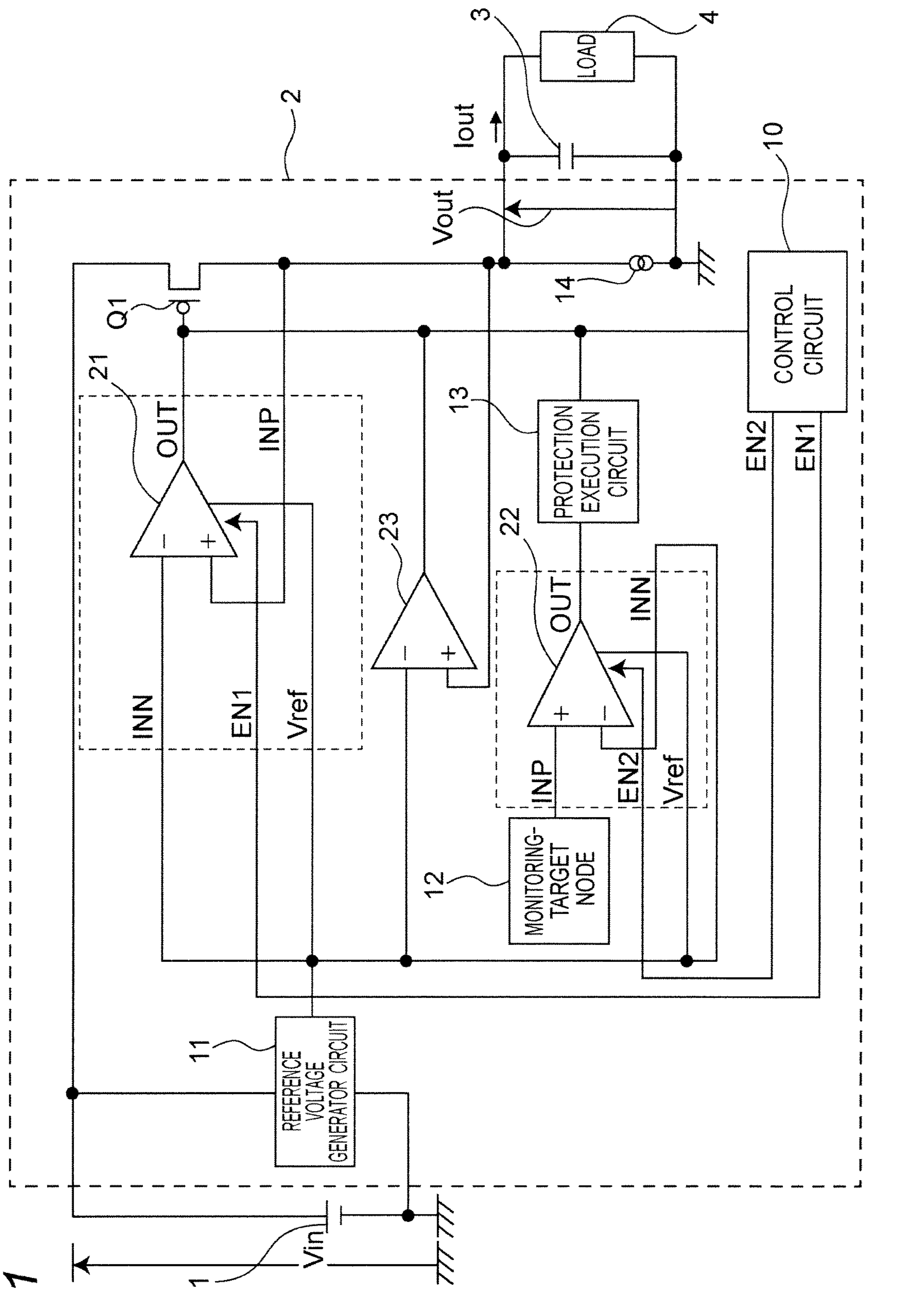
FIG. 1 is a block diagram illustrating a configuration example of a constant voltage generator circuit 2 and peripheral circuits thereof according to an embodiment.

Hereinafter, an embodiment according to the present invention will be described with reference to the drawings. It is noted that, the identical or same constituent elements will be assigned the identical reference characters.

Findings of Inventor

In the series regulator disclosed in Patent Document 1, it has been found that, when the switching of the operation mode occurs, the noise of the differential amplifier is superimposed on the output voltage from the reference voltage source having a high output resistance via the parasitic capacitance of the MOS transistor, and thus, a malfunction of a circuit called switching oscillation in which switching is performed between two operation modes occurs. The following embodiment is intended to prevent this malfunction.

EMBODIMENTS

FIG. 1 is a block diagram illustrating a configuration example of a constant voltage generator circuit 2 and peripheral circuits thereof according to an embodiment.

Referring to FIG. 1, an input voltage Vin is inputted from a DC voltage source 1 to the constant voltage generator circuit 2. The constant voltage generator circuit 2 is, for example, an LDO, generates a predetermined constant voltage Vout based on the input voltage Vin, and outputs the constant voltage to a load 4 via an output capacitor 3.

The constant voltage generator circuit 2 includes a reference voltage generator circuit 11, a monitoring target node 12, a protection execution circuit 13, a P-channel MOS transistor Q1, a current source 14, three differential amplifier circuits 21, 22, and 23, and a control circuit 10 that controls operations of the differential amplifier circuits 21 and 22.

The reference voltage generator circuit 11 converts the input voltage Vin into a predetermined reference voltage Vref, and outputs the reference voltage. The differential amplifier circuits 21 and 22 are, for example, "differential amplifier circuits with a voltage fluctuation suppression function" having the same circuit configuration, operate at an operation frequency of, for example, 10 MHz to several 100 MHz based on enable signals EN1 and EN2 from the control circuit 10, and operate at a higher speed and higher power consumption than those of the differential amplifier circuit 23. In this case, the differential amplifier circuits 21 and 22 operate in response to the enable signals EN1 and EN2 each having an H level from the control circuit 10, respectively, but do not operate in response to the enable signal EN1 having an L level. In this case, the differential amplifier circuit 21 is a main differential amplifier of the constant voltage generator circuit 2, generates a predetermined constant voltage, and supplies the predetermined constant voltage to the load 4. In addition, the differential amplifier circuit 23 is a sub-differential amplifier of the constant voltage generator circuit 2, generates a predetermined constant voltage, and supplies the predetermined constant voltage to the load 4.

In this case, the differential amplifier circuit 21 configures a main differential amplifier circuit that is dominant in control during a heavy load, and the differential amplifier circuit 22 configures a sub-differential amplifier circuit that is not dominant in control during the heavy load. That is, the two differential amplifier circuits 21 and 22 are operating during the heavy load, the differential amplifier circuit 21 having a large current consumption at this time is the main differential amplifier circuit, and the differential amplifier circuit 22 having a current consumption smaller than that the differential amplifier circuit 21 configures the sub-differential amplifier circuit.

Further, the differential amplifier circuit 22 detects, for example, a voltage of the monitoring target node 12 that changes in voltage in proportion to Vout, and configures a protection circuit that executes protection processing such as limitation of an output current Iout by using, for example, a known brick wall current limitation method or a fold-back current limitation method together with the protection execution circuit 13 including a differential amplifier.

The output terminals of the differential amplifier circuits 21 and 23 and the protection execution circuit 13 are connected to a gate of the MOS transistor Q1 that controls the output current Iout according to a gate voltage, and thus, the differential amplifier circuits 21 and 23 and the protection execution circuit 13 drive the MOS transistor Q1 to control the output current Iout flowing through the MOS transistor Q1. In addition, a positive electrode of the input voltage Vin is grounded via a source and a drain of the MOS transistor Q1 and the current source 14.

Figure 7A:
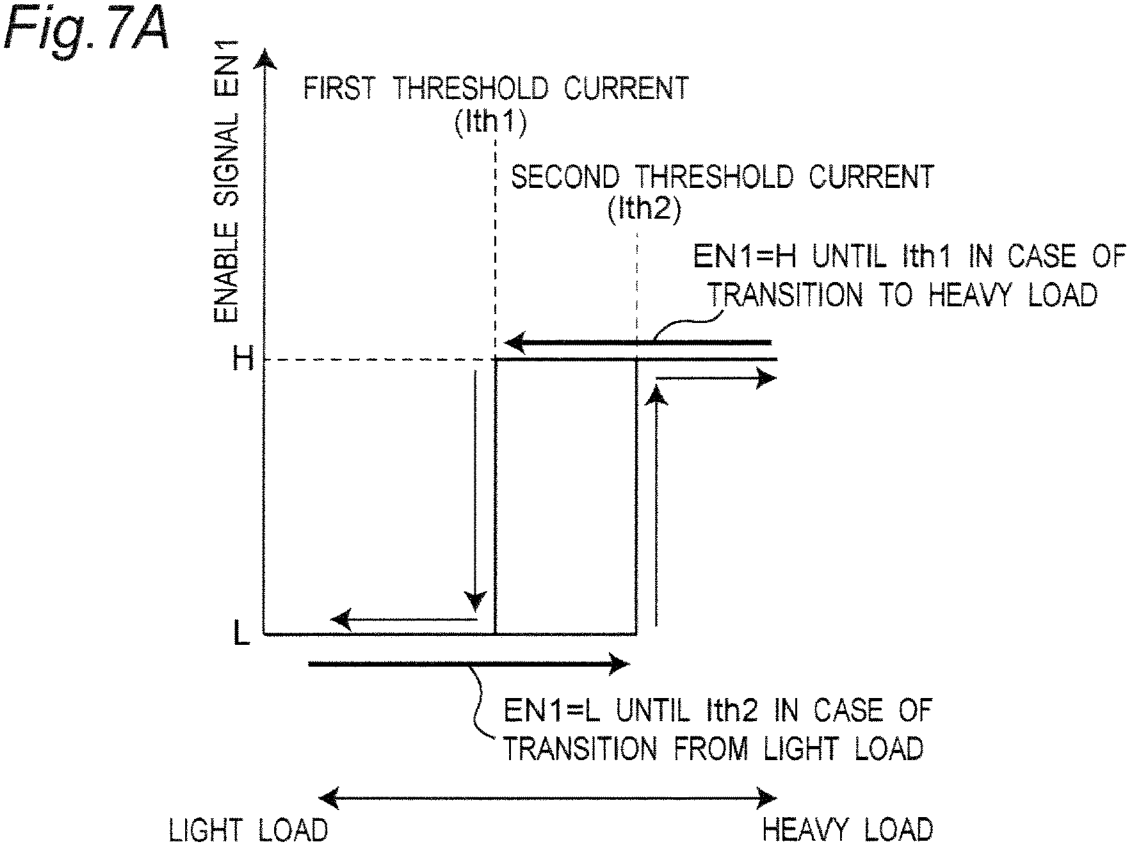
FIG. 7A is a diagram for describing setting values of threshold currents Ith1 and Ith2 used in the differential amplifier circuit 21 of FIG. 1.
Figure 7B:
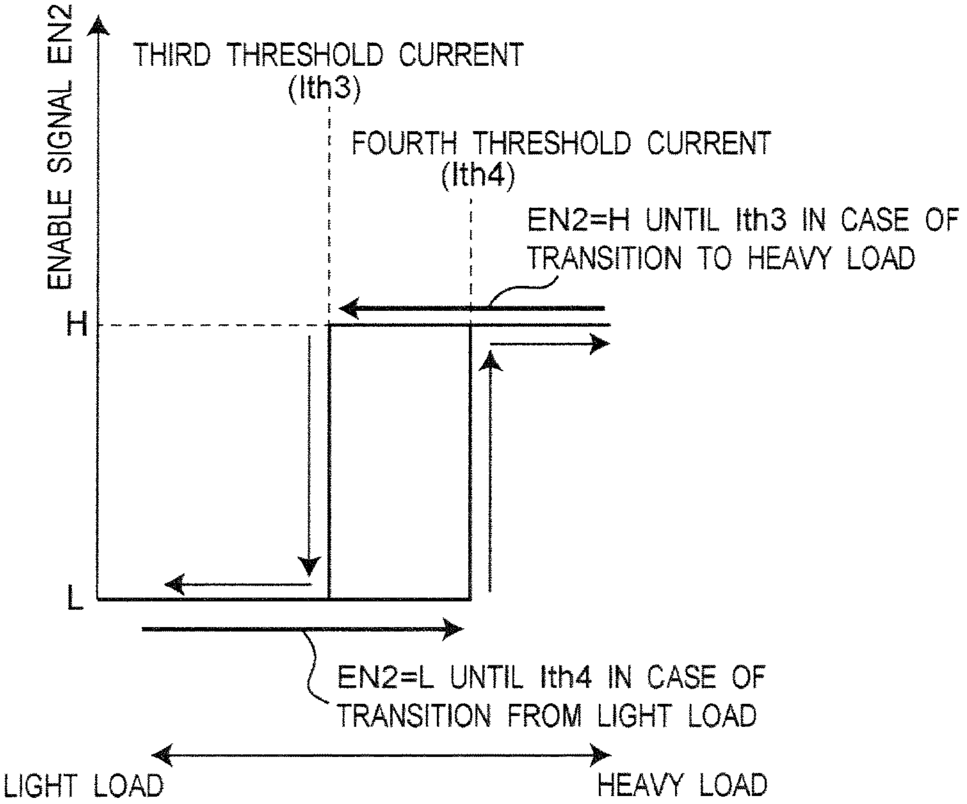
FIG. 7B is a diagram for describing setting values of threshold currents Ith3 and Ith4 used in the differential amplifier circuit 22 of FIG. 1.

FIG. 7A is a diagram for describing setting values of threshold currents Ith1 and Ith2 used in the differential amplifier circuit 21 of FIG. 1. In addition, FIG. 7B is a diagram for describing setting values of threshold currents Ith3 and Ith4 used in the differential amplifier circuit 22 of FIG. 1. The control circuit 10 operates as follows by converting the gate voltage of the MOS transistor Q1 into the output current Iout or based on a current signal indicating the output current Iout from a current sensor that detects the output current Iout flowing through an output voltage terminal.

(1) As illustrated in FIG. 7A, the control circuit 10 outputs the enable signal EN1 having the L level to the differential amplifier circuit 21 until the output current Iout increases from current 0 or a current during a light load and reaches the threshold current Ith2, and outputs the enable signal EN1 having the H level to the differential amplifier circuit 21 when Iout≥Ith2. On the other hand, the control circuit 10 outputs the enable signal EN1 having the H level to the differential amplifier circuit 21 until the output current Iout decreases from a current during the heavy load and reaches the threshold current Ith1 (<Ith2), and outputs the enable signal EN1 having the L level to the differential amplifier circuit 21 when Iout≤Ith1. That is, the control circuit 10 controls the differential amplifier circuit 21 by a hysteresis operation as illustrated in FIG. 7A.

(2) As illustrated in FIG. 7B, the control circuit 10 outputs the enable signal EN2 having the L level to the differential amplifier circuit 22 until the output current Iout increases from current 0 or the current during the light load and reaches the threshold current Ith4, and outputs the enable signal EN2 having the H level to the differential amplifier circuit 22 when Iout≥Ith4. On the other hand, the control circuit outputs the enable signal EN2 having the H level to the differential amplifier circuit 22 until the output current Iout decreases from a current during the heavy load and reaches the threshold current Ith3 (<Ith4), and outputs the enable signal EN2 having the L level to the differential amplifier circuit 22 when Iout≤Ith3. That is, the control circuit 10 controls the differential amplifier circuit 22 by a hysteresis operation as illustrated in FIG. 7B.

It is noted that, a relationship among the threshold currents Ith1 to Ith4 is set as follows:

$$Ith1 \leq Ith3 < Ith2 \quad (1)$$

$$Ith2 \leq Ith4 \quad (2)$$

In this case, as a "simple setting example of the threshold current", the threshold currents may be set such that Ith1=Ith3 and Ith2=Ith4.

Figure 2:
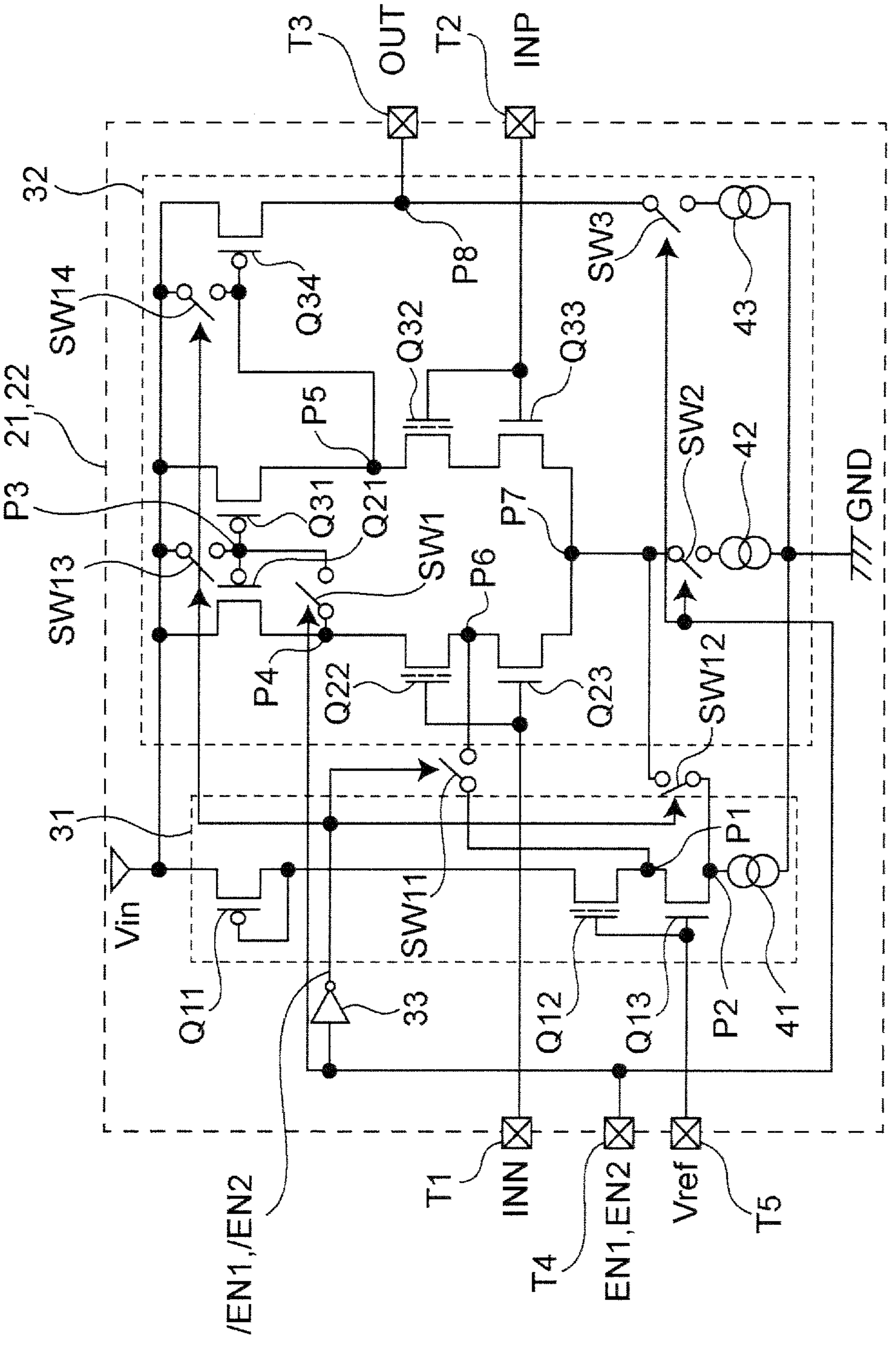
FIG. 2 is a circuit diagram illustrating a detailed configuration of differential amplifier circuits 21 and 22 of FIG. 1.

FIG. 2 is a circuit diagram illustrating a detailed configuration of each of the differential amplifier circuits 21 and 22 of FIG. 1. Referring to FIG. 2, each of the differential amplifier circuits 21 and 22 has the following five terminals T1 to T5.

(1) Inverting input terminal (INN) T1;
(2) Non-inverting input terminal (INP) T2;
(3) Output terminal T3;
(4) Enable signal terminal T4; and
(5) Reference voltage terminal T5.

Referring to FIG. 2, each of the differential amplifier circuits 21 and 22 is configured to include an inverter 33, a bias voltage generator circuit 31, switches SW11 and SW12, and a differential amplifier 32. It is noted that, in FIG. 2, among a plurality of MOS transistors Q11 to Q34, the MOS transistors Q12, Q22, and Q32 are configured of depression type, but may be configured of enhancement type, and the same applies hereinafter.

The bias voltage generator circuit 31 includes a P-channel MOS transistor Q11, an N-channel MOS transistor Q12, and an N-channel MOS transistor Q13, and these MOS transistors Q11, Q12 and Q13 are connected in series. The power source voltage Vin is applied to a source of the MOS transistor Q11, and a gate of the MOS transistor Q11 is connected to a drain thereof. Gates of the MOS transistors Q12 and Q13 are connected to each other and connected to the terminal T5. A connection point P1 between a source of the MOS transistor Q12 and a drain of the MOS transistor Q13 is connected to a connection point P6 between a source of the MOS transistor Q22 and a drain of the MOS transistor Q23 in the differential amplifier 32 via the switch SW11. Further, a source of the MOS transistor Q13 is grounded via the current source 41 via a connection point P2. The connection point P2 is connected to a connection point P7 in the differential amplifier 32 via the switch SW12.

The bias voltage generator circuit 31 having the above-described configuration converts the reference voltage Vref to be applied to the terminal T5 into a predetermined bias voltage, and applies the predetermined bias voltage to the connection point P6 in the differential amplifier 32 via the switch SW11.

The differential amplifier 32 of FIG. 2 includes MOS transistors Q21, Q22, Q23, Q31, Q32, Q33, and Q34, switches SW1, SW2, SW3, SW13, and SW14, and current sources 42 and 43. The MOS transistor Q21, a connection point P4, the MOS transistor Q22, the connection point P6, and the MOS transistor Q23 are connected in series with each other, a source of the MOS transistor Q21 is connected to the power source voltage Vin, and a source of the MOS transistor Q23 is grounded via the switch SW2 and the current source 42. In addition, the MOS transistor Q31, a connection point P5, and the MOS transistors Q32 and 33 are connected in series with each other, a source of the MOS transistor Q31 is connected to the power source voltage Vin, and a source of the MOS transistor Q33 is grounded via the switch SW2 and the current source 42. Further, the connection point P3 at which the gates of the MOS transistors Q21 and Q31 are connected to each other is connected to the power source voltage Vin via the switch SW13, and is connected to the connection point P4 via the switch SW1.

The gates of the MOS transistors Q32 and Q33 are connected to each other and are then connected to the terminal T2. The connection point P5 is connected to the gate of the MOS transistor Q34, and the gate of the MOS transistor Q34 is connected to the power source voltage Vin and the source of the MOS transistor Q34 via the switch SW14. A drain of the MOS transistor Q34 is grounded via a connection point connected to the terminal T3, the switch SW3, and the current source 43.

The enable signals EN1 and EN2 to be inputted to the terminal T4 are inputted to control terminals of the switches SW1 to SW3, and inverted enable signals/EN1 and/EN2 to be inputted to the inverter 33 and to be outputted from the inverter 33 are inputted to control terminals of the switches SW11 to SW14. When the enable signals EN1 and EN2 having the H level are inputted to the control terminals of the switches SW1 to SW3, the switches SW1 to SW3 are turned on, and when the enable signals EN1 and EN2 each having the L level are inputted, the switches SW1 to SW3 are turned off. In addition, when the inverted enable signals /EN1 and/EN2 having the H level are inputted to the control terminals of the switches SW11 to SW14, the switches SW11 to SW14 are turned on, and when the inverted enable signals/EN1 and/EN2 each having the L level are inputted, the switches SW11 to SW14 are turned off.

In each of the differential amplifier circuits 21 and 22 having the above-described configuration, when the enable signals EN1 and EN2 having the H level are inputted, the switches SW1 to SW3 are turned on and the switches SW11 to SW14 are turned off. At this time, the differential amplifier 32 enters an operation state in a state where the predetermined bias voltage from the bias voltage generator circuit 31 is not applied to the differential amplifier 32. Accordingly, the differential amplifier 32 subtracts the inverting input voltage INN to be inputted to the inverting input terminal T1 from the non-inverting input voltage INP to be inputted to the non-inverting input terminal T2, and outputs the output voltage obtained by amplifying the voltage of the subtraction result from the terminal T3. It is noted that, the terminal T3 of the differential amplifier circuit 21 is connected to the gate of the MOS transistor Q1 of FIG. 1, and the terminal T3 of the differential amplifier circuit 22 is connected to the gate of the MOS transistor Q1 via the protection execution circuit 13 of FIG. 1.

In addition, when the enable signals EN1 and EN2 each having the L level are inputted, the switches SW1 to SW3 are turned off and the switches SW11 to SW14 are turned on. At this time, the differential amplifier 32 enters such a non-operation state that the predetermined bias voltage from the bias voltage generator circuit 31 is applied to the differential amplifier 32. Accordingly, the differential amplifier 32 does not perform the differential amplification and is in a stop state without an output from the terminal T3. However, since the predetermined bias voltage is applied, the voltage fluctuations of the connection points P6 and P7 are suppressed, and thus, fluctuations in the gate voltages of the MOS transistors Q22 and Q23 via parasitic capacitances of the MOS transistors Q22 and Q23 are suppressed.

That is, each of the differential amplifier circuits 21 and 22 performs the differential amplification operation during the operation, and does not perform the differential amplification operation during the non-operation. However, at this time, since the predetermined bias voltage is applied to the internal nodes (connection point P6 or P7), it is possible to suppress a fluctuation in the reference voltage.

Figure 3:
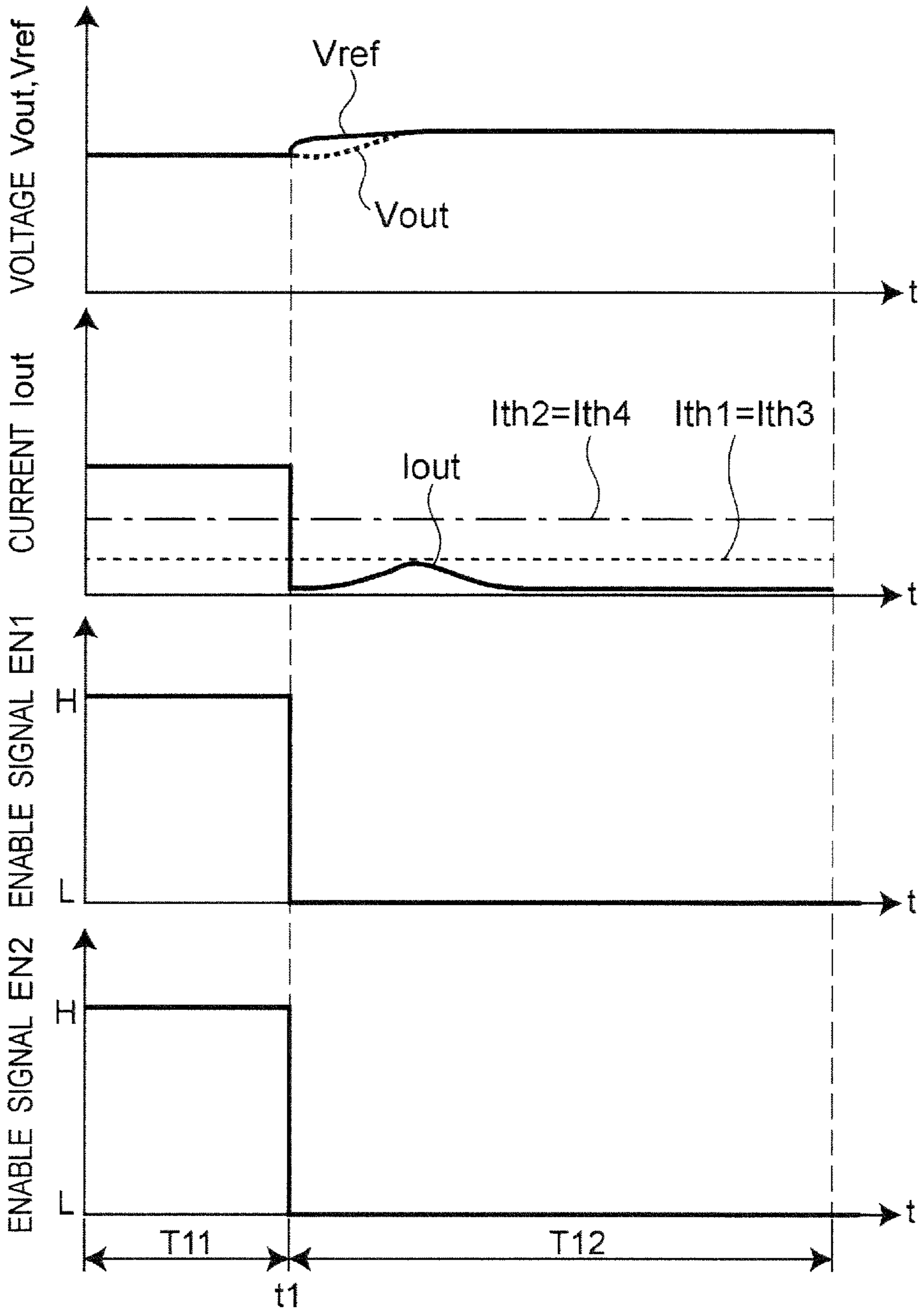
FIG. 3 is a timing chart illustrating stop operations of the differential amplifier circuit 22 and the differential amplifier circuit 21 for a protection execution circuit 13 of the constant voltage generator circuit 2 of FIG. 1.

FIG. 3 is a timing chart illustrating stop operations of the differential amplifier circuit 22 and the differential amplifier circuit 21 for the protection execution circuit 13 of the constant voltage generator circuit 2 of FIG. 1. It is noted that, FIG. 3 illustrates a case of a simple setting example of the threshold current when the threshold currents are set such that Ith1=Ith3 and Ith2=Ith4.

In a time interval T11 of FIG. 3, since the enable signals EN1 and EN2 have the H level, the differential amplifier circuit 21 is in the operation state, the differential amplifier circuit 22 for the protection execution circuit 13 is in the operation state, and the protection circuit is operating. Subsequently, at time t1, the output current Iout decreases by changing from the heavy load to the light load, the output current Iout≤Ith3. Thus, since the enable signal EN2 becomes the L level, the control circuit 10 stops the operation of the differential amplifier circuit 22 for the protection execution circuit 13. In addition, the enable signal EN1 has the L level, and in the differential amplifier circuit 21, the differential amplifier 32 is in the non-operation state in a state where the bias voltage is applied to the differential amplifier 32. Accordingly, the differential amplifier circuit 21 is in a state of not performing the differential amplification described above. However, since the predetermined bias voltage is applied, the fluctuation in the reference voltage via the parasitic capacitances of the MOS transistors Q22 and Q23 is suppressed. The above effect is similarly exhibited in the differential amplifier circuit 22. At this time, since a change in an output voltage of a reference voltage source is small due to the effect of the bias voltage, a fluctuation in the output current Iout is also small, the differential amplifier circuit 22 and the differential amplifier circuit 21 for the protection execution circuit 13 do not malfunction, and the output voltage Vout does not oscillate.

As described above, each of the differential amplifier circuits 21 and 22 is configured of the "differential amplifier circuit with the voltage fluctuation suppression function" as illustrated in FIG. 2. When each of the differential amplifier circuits 21 and 22 is in the stop state, since the predetermined bias voltage is applied to the differential amplifier 32 of each of the differential amplifier circuits 21 and 23, the fluctuation in the reference voltage via the parasitic capacitances of the MOS transistors Q22 and Q23 is suppressed. At this time, since the voltage fluctuation of the output voltage Vout is small due to the effect of the bias voltage, the fluctuation in the output current Iout is also small, the differential amplifier circuits 21 and 22 and the protection execution circuit 13 do not malfunction, and the output voltage Vout does not oscillate. That is, the offset voltage of the differential amplifier can be set to be small by suppressing the change in the output voltage of the reference voltage source, and it is possible to prevent the malfunction in which the power source circuit continues to transition a plurality of modes while suppressing degradation of the accuracy of the output voltage Vout between the modes.

Modified Embodiments of Embodiments

In the above embodiment, a stop control circuit that stops the operation of the differential amplifier circuit 22 used for the protection execution circuit 13 when the differential amplifier circuit 22 for the protection execution circuit 13 is in the stopped state, or the bias voltage generator circuit 31 that fixes the bias voltage of the differential amplifier circuit 22 is provided. The present invention is not limited thereto, and these functional circuits may be provided only in the differential amplifier circuit 21 and may not be provided in the differential amplifier circuit 22, or may not have a function of stopping the operation according to the output current by the enable signal EN2 from the control circuit 10.

In the above embodiment, the differential amplifier circuit 23 is configured of a normal differential amplifier circuit without any voltage fluctuation suppression function. The present invention is not limited thereto, and the differential amplifier circuit 23 may be configured of a differential amplifier circuit with the voltage fluctuation suppression function in a manner similar to that of each of the differential amplifier circuits 21 and 22.

In the above embodiment, the MOS transistors Q12 and Q13, the MOS transistors Q22 and Q23, and the MOS transistors Q32 and Q33 are cascode-connected. The present invention is not limited thereto, and may be configured to include only one MOS transistor Q13, one MOS transistor Q23, and one MOS transistor Q33 without any cascode connection.

Other Modified Embodiments

In the above embodiment, although the differential amplifier circuits 21 and 22 used in the constant voltage generator circuit 2 have been described, first, second, and third modified embodiments of the differential amplifier circuits 21 and 22 will be described below. It is noted that, although differential amplifier circuits 21A, 21B, and 21C will be described below, these configurations may be similarly applied to the differential amplifier circuits 21 and 22.

First Modified Embodiment

Figure 4:
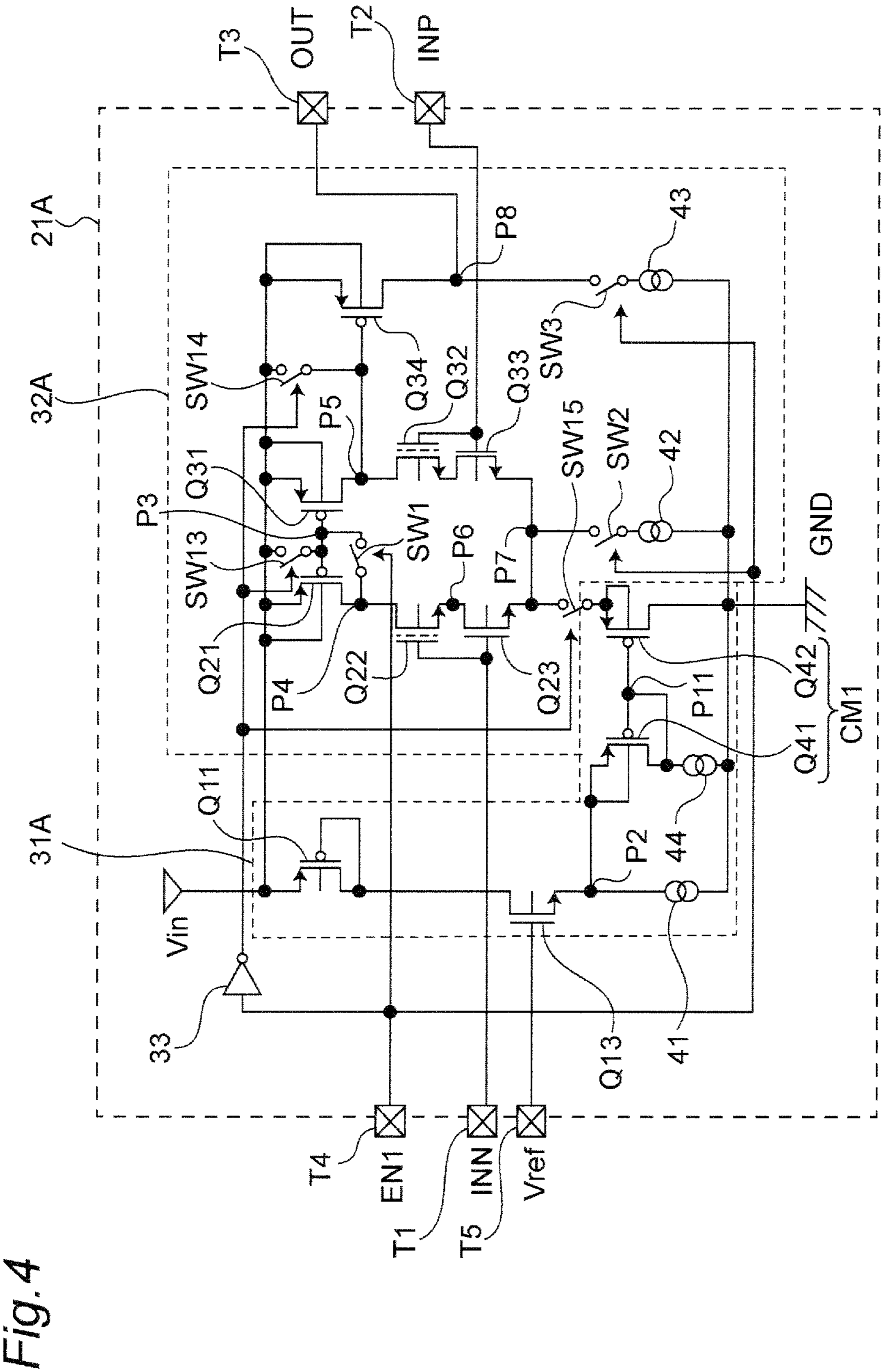
FIG. 4 is a block diagram illustrating a configuration example of a differential amplifier circuit 21A according to a first modified embodiment.

FIG. 4 is a block diagram illustrating a configuration example of the differential amplifier circuit 21A according to the first modified embodiment. Referring to FIG. 4, the same constituent elements as those of FIG. 2 are denoted by the same reference characters. The differential amplifier circuit 21A of FIG. 4 is different from the differential amplifier circuits 21 and 22 of FIG. 2 in the following points:

(1) a bias voltage generator circuit 31A is provided instead of the bias voltage generator circuit 31; and (2) a differential amplifier 32A is provided instead of the differential amplifier 32.

Hereinafter, the differences will be described.

Referring to FIG. 4, the bias voltage generator circuit 31A is configured to include MOS transistors Q11 and Q13, current sources 41 and 44, and MOS transistors Q41 and Q42. The bias voltage generator circuit 31A is different from the bias voltage generator circuit 31 in the following points:

(1) the MOS transistor Q12 is removed; and (2) the current mirror circuit CM1 is configured to include the MOS transistors Q41 and Q42, and thus, the bias voltage corresponding to the source voltage potential of the MOS transistor Q13 is generated by the current mirror circuit CM1, and the bias voltage is outputted to a connection point P7 via a switch SW15.

The enable signal EN1 to be inputted to the terminal T4 is inputted to each of the control terminals of switches SW1 to SW3, and is inputted to each of the control terminals of switches SW13 to SW15 via an inverter 33.

In accordance with the differential amplifier circuit 21A having the above-described configuration, the change in the output voltage of the reference voltage source can be suppressed, by generating the bias voltage corresponding to the source voltage potential of the MOS transistor Q13 by the current mirror circuit CM1 during the non-operation, and outputting the bias voltage to the connection point P7 of the differential amplifier 32A.

Second Modified Embodiment

Figure 5:
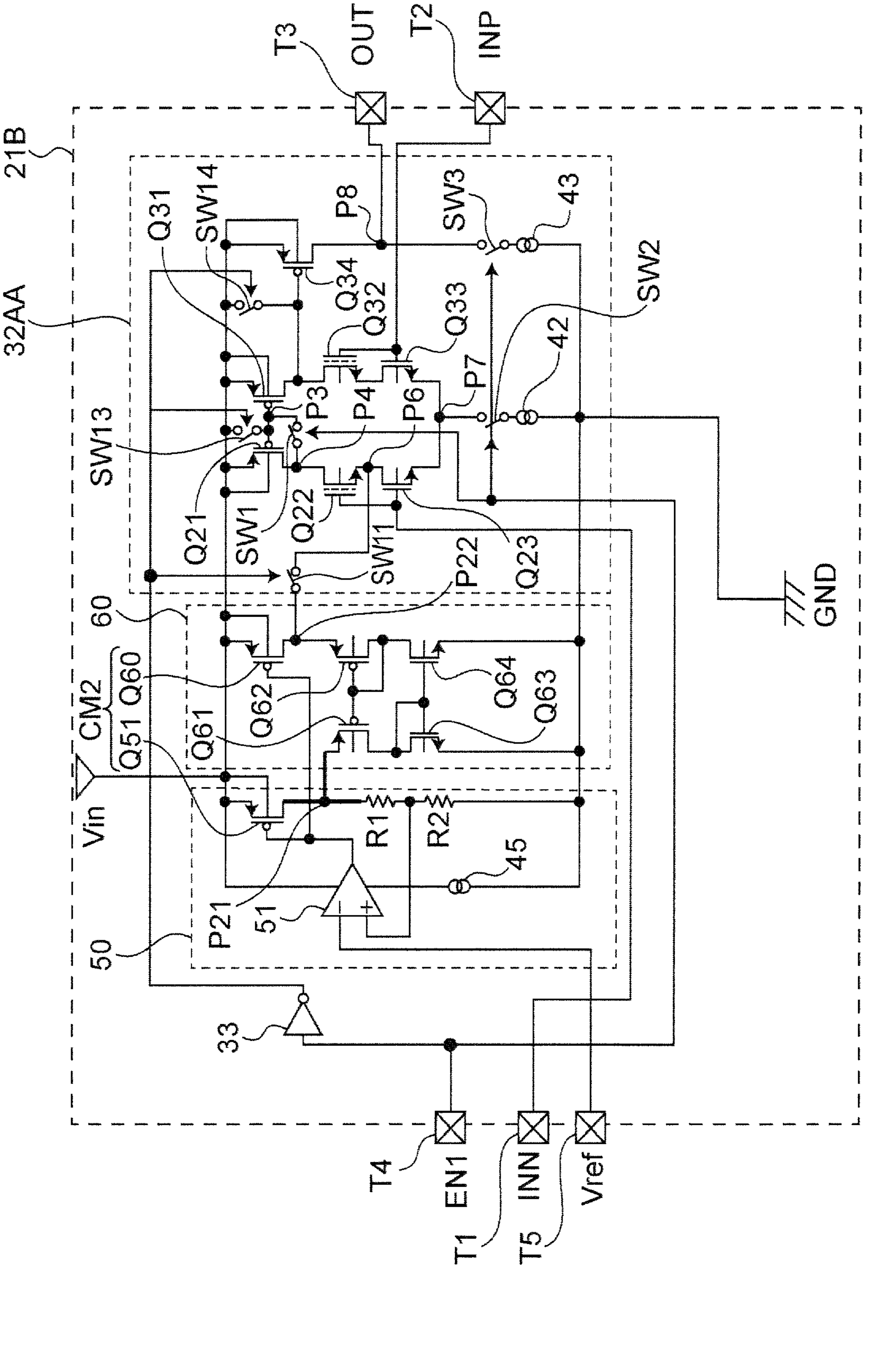
FIG. 5 is a block diagram illustrating a configuration example of a differential amplifier circuit 21B according to a second modified embodiment.

FIG. 5 is a block diagram illustrating a configuration example of a differential amplifier circuit 21B according to the second modified embodiment. Referring to FIG. 5, the same constituent elements as those of FIGS. 2 and 4 are denoted by the same reference characters. The differential amplifier circuit 21B of FIG. 5 is different from the differential amplifier circuit 21A of FIG. 4 in the following points:

(1) a bias voltage generator circuit including an internal reference voltage generator circuit 50 and a voltage generator circuit 60 is provided instead of the bias voltage generator circuit 31A; and (2) a differential amplifier 32AA is provided instead of the differential amplifier 32A, and it is noted that, the differential amplifier 32AA includes a switch SW11 that connects a connection point P22 of the voltage generator circuit 60 to a connection point P6 of the differential amplifier 32AA, instead of the switch SW15, as compared with the differential amplifier 32A.

Accordingly, the differential amplifier circuit 21B is configured to include the internal reference voltage generator circuit 50, the voltage generator circuit 60, and the differential amplifier 32AA. Hereinafter, the differences will be described.

Referring to FIG. 5, the internal reference voltage generator circuit 50 includes a differential amplifier 51, a P-channel MOS transistor Q51, and voltage-dividing resistors R1 and R2, and is configured by a known reference voltage generator circuit. Accordingly, the internal reference voltage generator circuit 50 generates a predetermined internal reference voltage based on the reference voltage Vref to be inputted to the terminal T5, and outputs the predetermined internal reference voltage to a source of a MOS transistor Q61 of the voltage generator circuit 60 via a connection point P21. In this case, the voltage at the connection point P21 may be used as the reference voltage by being outputted to the outside of the block.

The voltage generator circuit 60 includes P-channel MOS transistors Q60 to Q62 and N-channel MOS transistors Q63 and Q64. In this case, the MOS transistors Q51 and Q60 configures a current mirror circuit CM2. In addition, the MOS transistors Q61 to Q64 configures a current mirror circuit. Accordingly, the voltage generator circuit 60 adjusts an output impedance of a constant voltage from the internal reference voltage generator circuit 50 by the current mirror circuit CM2, and outputs the constant voltage to the differential amplifier 32AA.

The enable signal EN1 to be inputted to a terminal T4 is inputted to each of the control terminals of the switches SW1 to SW3, and is inputted to each of the control terminals of the switches SW11, SW13, and SW14 via an inverter 33.

In accordance with the differential amplifier circuit 21B having the above-described configuration, the change in the output voltage of the reference voltage source can be suppressed by generating the bias voltage corresponding to the drain voltage potential of the MOS transistor Q51 by the current mirror circuit CM2 during the non-operation and outputting the bias voltage to the connection point P6 of the differential amplifier 32AA.

Third Modified Embodiment

Figure 6:
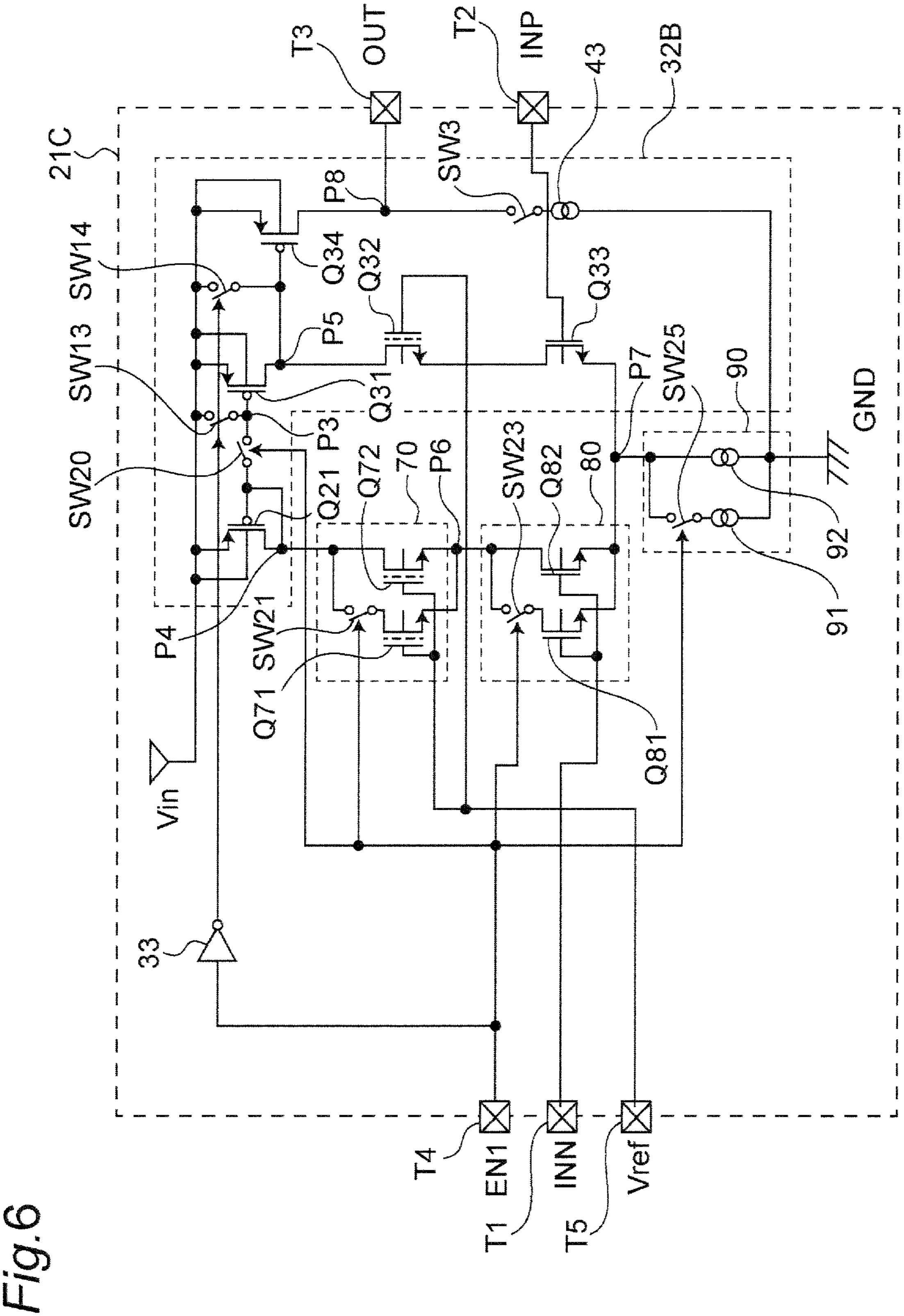
FIG. 6 is a block diagram illustrating a configuration example of a differential amplifier circuit 21C according to a third modified embodiment.

FIG. 6 is a block diagram illustrating a configuration example of a differential amplifier circuit 21C according to the third modified embodiment. The differential amplifier circuit 21C of FIG. 6 is different from the differential amplifier circuit 21 of FIG. 2 in the following points:

(1) a current generator circuit including two parallel transistor circuits 70 and 80 and a current source circuit 90 is provided instead of the bias voltage generator circuit 31; and (2) a differential amplifier 32B is provided instead of the differential amplifier 32.

Hereinafter, the differences will be described.

The differential amplifier 32B includes switches SW3, SW13, SW14, and SW20, MOS transistors Q21, Q31, Q32, Q33, and Q34, and a current source 43. In this case, the MOS transistor Q34 and the current source 43 configures an output amplifier circuit.

The two parallel transistor circuits 70 and 80 are connected in series between the MOS transistor Q21 and the current source circuit 90. In this case, the parallel transistor circuit 70 includes two MOS transistors Q71 and Q72 and a switch SW21. In addition, the parallel transistor circuit 80 includes two MOS transistors Q81 and Q82 and a switch SW23. Further, the current source circuit 90 includes two current sources 91 and 92 and a switch SW25. Accordingly, when the switches SW21 to SW25 are turned off (during the non-operation of the differential amplifier 32B), a flowing current is smaller than that when the switches SW21 to SW25 are turned on (during the operation of the differential amplifier 32B). In particular, when the differential amplifier 32B is not operated, the small current is caused to flow from the current generator circuit to the internal nodes (the connection points P4, P6, and P7) of the differential amplifier 32B to fix an operation voltage potential. Thus, the change in the output voltage of the reference voltage source is suppressed.

It is noted that, the number of each of the MOS transistors connected to the switches in the parallel transistor circuits 70 and 80 is not limited to one, and may be a plurality of MOS transistors.

In the above-described embodiment and first and second modified embodiments, the predetermined bias voltages are applied from the bias voltage generator circuits 31 and 31A and the voltage generator circuit 60 to the internal nodes of the differential amplifiers 32, 32A, and 32AA, respectively, during the non-operations of the differential amplifiers 32, 32A, and 32AA. Thus, the voltage potential fluctuation of the reference voltage is suppressed by fixing operation voltage potentials of the differential amplifiers 32, 32A, and 32AA (configuring the operation voltage potential fixing circuit). On the other hand, in the third modified embodiment, when the differential amplifier 32B is not operated, a predetermined small current is caused to flow to the internal nodes (the connection points P4, P6, and P7) of the differential amplifier 32B (the current generator circuit) to fix the operation voltage potential (the operation voltage potential fixing circuit is configured), and thus, the voltage potential fluctuation of the reference voltage is suppressed.

Further Modified Embodiments

In the above embodiment and modified embodiments, the switches SW1 to SW25 are provided. In this case, the switches SW1 to SW25 are configured of semiconductor switch elements made of MOS transistors, for example.

Although the differential amplifiers 32, 32A, and 32B are used in the above embodiment and modified embodiments, the present invention is not limited thereto, and an amplifier that amplifies an input voltage may be used.

INDUSTRIAL APPLICABILITY

As mentioned above in detail, in accordance with the constant voltage generator circuit according to the present invention, it is possible to suppress the change in the output voltage of the reference voltage source caused by the noise superimposition via the coupling capacitance. As a result, the offset voltage of the differential amplifier can be set to be small, and it is possible to prevent the malfunction in which the power source circuit continues to transition between the plurality of modes while suppressing the deterioration in the accuracy of the output voltage generated as the difference in the output voltage between the modes.

The invention claimed is:

1. A constant voltage generator circuit comprising:

an output transistor that is connected between a power source and a load, and controls an output current;

a first amplifier circuit that drives the output transistor based on a reference voltage generated based on a voltage of the power source;

a second amplifier circuit that is connected in parallel to the first amplifier circuit, operates at a speed higher than that of the first amplifier circuit, and drives the output transistor based on the reference voltage corresponding to the power source;

a protection circuit configured to limit the output current flowing through the load from the output transistor during a predetermined operation; and a control circuit configured to control an operation of the second amplifier circuit, wherein the second amplifier circuit includes a first differential amplifier circuit including a first transistor pair, which includes a first differential pair including a first internal node to which a first bias voltage is applied to determine an operating point of the second amplifier circuit, wherein the first transistor pair includes a first input transistor circuit that inputs a first input voltage applied to a non-inverting input terminal of the first differential amplifier circuit of the second amplifier circuit, and a second input transistor circuit that inputs a second input voltage applied to an inverting input terminal of the first differential amplifier circuit of the second amplifier circuit, wherein the first input transistor circuit includes a first transistor, the first input voltage is input to a gate of the first transistor, a drain of the first transistor is connected to the power source via a second transistor, and a source of the first transistor is grounded via a first current source, wherein the second input transistor circuit includes a third transistor, the second input voltage is input to a gate of the third transistor, a drain of the third transistor is connected to the first internal node and is connected to the power source via a fourth transistor, and a source of the third transistor is grounded via the first current source, wherein the control circuit controls the second amplifier circuit not to operate until the output current increases from a current during a light load and reaches a predetermined second threshold current, and to operate when the output current is equal to or greater than the second threshold current, and the control circuit controls the second amplifier circuit to operate until the output current decreases from a current during a heavy load and reaches a predetermined first threshold current smaller than the second threshold current, and not to operate when the output current is equal to or less than the first threshold current, wherein the second amplifier circuit further includes a first operation voltage potential fixing circuit that fixes an operation voltage potential of the first internal node during non-operation of the second amplifier circuit, and wherein the first operation voltage potential fixing circuit includes one of the following:

(A) a first bias voltage generator circuit configured to fix the operation voltage potential by applying the first bias voltage to the first internal node during the non-operation of the second amplifier circuit; or (B) a first current generator circuit that fixes the operation voltage potential by applying a predetermined first current to the first internal node during the non-operation of the second amplifier circuit.

2. The constant voltage generator circuit as claimed in claim 1, wherein the protection circuit includes a third amplifier circuit which includes a second differential amplifier circuit including a second transistor pair, which includes a second differential pair including a second internal node to which is applied a second bias voltage to determine an operating point of the third amplifier circuit, wherein the second transistor pair includes a third input transistor circuit that inputs a third input voltage applied to a non-inverting input terminal of the second differential amplifier circuit of the third amplifier circuit, and a fourth input transistor circuit that inputs a fourth input voltage applied to an inverting input terminal of the second differential amplifier circuit of the third amplifier circuit, wherein the third input transistor circuit includes a fifth transistor, wherein the third input voltage is input to a gate of the fifth transistor, a drain of the fifth transistor is connected to the power source via a sixth transistor, and a source of the fifth transistor is grounded via a second current source, wherein the fourth input transistor circuit includes a seventh transistor, wherein the fourth input voltage is input to a gate of the seventh transistor, a drain of the seventh transistor is connected to the second internal node, and the drain of the seventh transistor is connected to the power source via an eighth transistor, and a source of the seventh transistor is grounded via the second current source, and wherein the control circuit controls the third amplifier circuit not to operate until the output current increases from the current during the light load and reaches a predetermined fourth threshold current, and to operate when the output current is equal to or greater than the fourth threshold current, whereas the control circuit controls the third amplifier circuit to operate until the output current decreases from the current during the heavy load and reaches a predetermined third threshold current smaller than the fourth threshold current, and not to operate when the output current is equal to or less than the third threshold current.

3. The constant voltage generator circuit as claimed in claim 2, wherein the first threshold current is set to be equal to the third threshold current, and the second threshold current is set to be equal to the fourth threshold current.

4. The constant voltage generator circuit as claimed in claim 2, wherein the protection circuit further includes a second operation voltage potential fixing circuit that fixes the operation voltage potential of the second internal node during non-operation of the third amplifier circuit.

5. The constant voltage generator circuit as claimed in claim 4, wherein the second operation voltage potential fixing circuit includes one of the following:

(a) a second bias voltage generator circuit that fixes the operation voltage potential by applying the second bias voltage to the second internal node during non-operation of the protection circuit; or (b) a second current generator circuit that fixes the operation voltage potential by applying a predetermined second current to the second internal node during the non-operation of the protection circuit.

6. The constant voltage generator circuit as claimed in claim 5, wherein the second bias voltage generator circuit comprises:

a first voltage generator circuit including at least two transistors connected in series, the first voltage generator circuit generating the first bias voltage based on the reference voltage; and a third voltage generator circuit including a current mirror circuit, the third voltage generator circuit generating a further bias voltage corresponding to the first bias voltage generated by the first voltage generator circuit, and outputting the further bias voltage to the second internal node.

7. The constant voltage generator circuit as claimed in claim 5, wherein the second bias voltage generator circuit comprises:

an internal reference voltage generator circuit that, based on the reference voltage, generates a predetermined internal reference voltage, and a voltage generator circuit that generates the second bias voltage based on the internal reference voltage, adjusts an output impedance using a current mirror circuit, and outputs the second bias voltage to the second internal node.

8. The constant voltage generator circuit as claimed in claim 5, wherein the second current generator circuit flows a predetermined current to the second internal node during operation of the third amplifier circuit, and flows a predetermined other current, which is smaller than the predetermined current, to the second internal node during the non-operation of the third amplifier circuit.

9. The constant voltage generator circuit as claimed in claim 1, wherein the first bias voltage generator circuit includes at least two transistors connected in series, the first bias voltage generator circuit generating the first bias voltage based on the reference voltage.

10. The constant voltage generator circuit as claimed in claim 1, wherein the first bias voltage generator circuit includes:

a first voltage generator circuit including at least two transistors connected in series, the first voltage generator circuit generating the first bias voltage based on the reference voltage; and a second voltage generator circuit including a current mirror circuit, the second voltage generator circuit generating a further bias voltage corresponding to the first bias voltage generated by the first voltage generator circuit and outputting the further bias voltage to the first internal node.

11. The constant voltage generator circuit as claimed in claim 1, wherein the first bias voltage generator circuit includes:

an internal reference voltage generator circuit that generates a predetermined internal reference voltage based on the reference voltage, and a voltage generator circuit that generates the first bias voltage based on the internal reference voltage, adjusts an output impedance using a current mirror circuit, and outputs the first bias voltage to the first internal node.

12. The constant voltage generator circuit as claimed in claim 1, wherein the first current generator circuit flows a predetermined other current to the first internal node during the operation of the second amplifier circuit, and flows the predetermined first current, which is smaller than the predetermined other current, to the first internal node during the non-operation of the second amplifier circuit.

* * * * *